US 7,107,305 B2

(12) United States Patent
Deng et al.

(10) Patent No.: US 7,107,305 B2
(45) Date of Patent: Sep. 12, 2006

(54) MULTIPLY-ACCUMULATE (MAC) UNIT FOR SINGLE-INSTRUCTION/MULTIPLE-DATA (SIMD) INSTRUCTIONS

(75) Inventors: Deli Deng, Austin, TX (US); Anthony Jebson, Austin, TX (US); Yuyun Liao, Chandler, AZ (US); Nigel C. Paver, Austin, TX (US); Steve J. Strazdus, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 09/972,720

(22) Filed: Oct. 5, 2001

(65) Prior Publication Data

US 2003/0069913 A1 Apr. 10, 2003

(51) Int. Cl.
G06F 7/38 (2006.01)
(52) U.S. Cl. ........................ 708/523; 708/233
(58) Field of Classification Search ................ 708/490, 708/523, 524, 521, 233
See application file for complete search history.

(56) References Cited

U.S. PATENT DOCUMENTS

| 5,777,679 | A | * | 7/1998 | Cheney et al. .............. 708/203 |
| 5,847,981 | A | | 12/1998 | Kelley et al. |
| 6,035,316 | A | * | 3/2000 | Peleg et al. .................. 708/523 |
| 6,532,485 | B1 | * | 3/2003 | Wang .......................... 708/523 |
| 6,542,915 | B1 | * | 4/2003 | Dibrino et al. ............. 708/501 |
| 6,571,268 | B1 | * | 5/2003 | Giacalone et al. .......... 708/524 |
| 6,574,651 | B1 | * | 6/2003 | Cui et al. .................... 708/523 |
| 2003/0014457 | A1 | * | 1/2003 | Desai et al. |
| 2004/0117422 | A1 | * | 6/2004 | Debes et al. |

FOREIGN PATENT DOCUMENTS

WO    WO 01/48595    7/2001

OTHER PUBLICATIONS

Ackland, B., et al., "A Single-Chip, 1.6-Billion, 16-b MAC/s Multiprocessor DSP", *IEEE J. of Solid-State Circuits*, 35(3):412-424. (2000).

Alidina, M., et al., "DSP16000: A High Performance, Low Power Dual-MAC DSP Core for Communications Applications", *IEEE Custom Integrated Circuits Conference*, pp. 119-122 (1998).

* cited by examiner

*Primary Examiner*—Wei Zhen
*Assistant Examiner*—Chat C. Do
(74) *Attorney, Agent, or Firm*—Fish & Richardson P.C.

(57) ABSTRACT

A tightly coupled dual 16-bit multiply-accumulate (MAC) unit for performing single-instruction/multiple-data (SIMD) operations may forward an intermediate result to another operation in a pipeline to resolve an accumulating dependency penalty. The MAC unit may also be used to perform 32-bit×32-bit operations.

9 Claims, 10 Drawing Sheets

MULTIPLY-ACCUMULATE (MAC) UNIT FOR SINGLE-INSTRUCTION/MULTIPLE-DATA (SIMD) INSTRUCTIONS

BACKGROUND

Digital signal processors (DSPs) may operate as SIMD (Single-Instruction/Multiple-Data), or data parallel, processors. In SIMD operations, a single instruction is sent to a number of processing elements, which perform the same operation on different data. SIMD instructions provide for several types of standard operations including addition, subtraction, multiplication, multiply-accumulate (MAC), and a number of special instructions for performing, for example, clipping and bilinear interpolation operations.

Many DSP applications, including many speech codecs, require high performance 16-bit multiply-accumulate (MAC) operations. To achieve high performance for these 16-bit DSP applications, 64-bit SIMD instructions may be introduced. The 64-bit SIMD instructions may be used to handle media streams more efficiently and reduce register pressure and memory traffic since four 16-bit data items may be loaded into a 64-bit register at one time.

While high throughput is an important factor for achieving high performance, power consumption may also be an important consideration in designing DSPs for wireless/handheld products. Accordingly, MAC architectures which are capable of high performance with low power demands may be desirable for use in DSPs.

DETAILED DESCRIPTION

Figure 1:
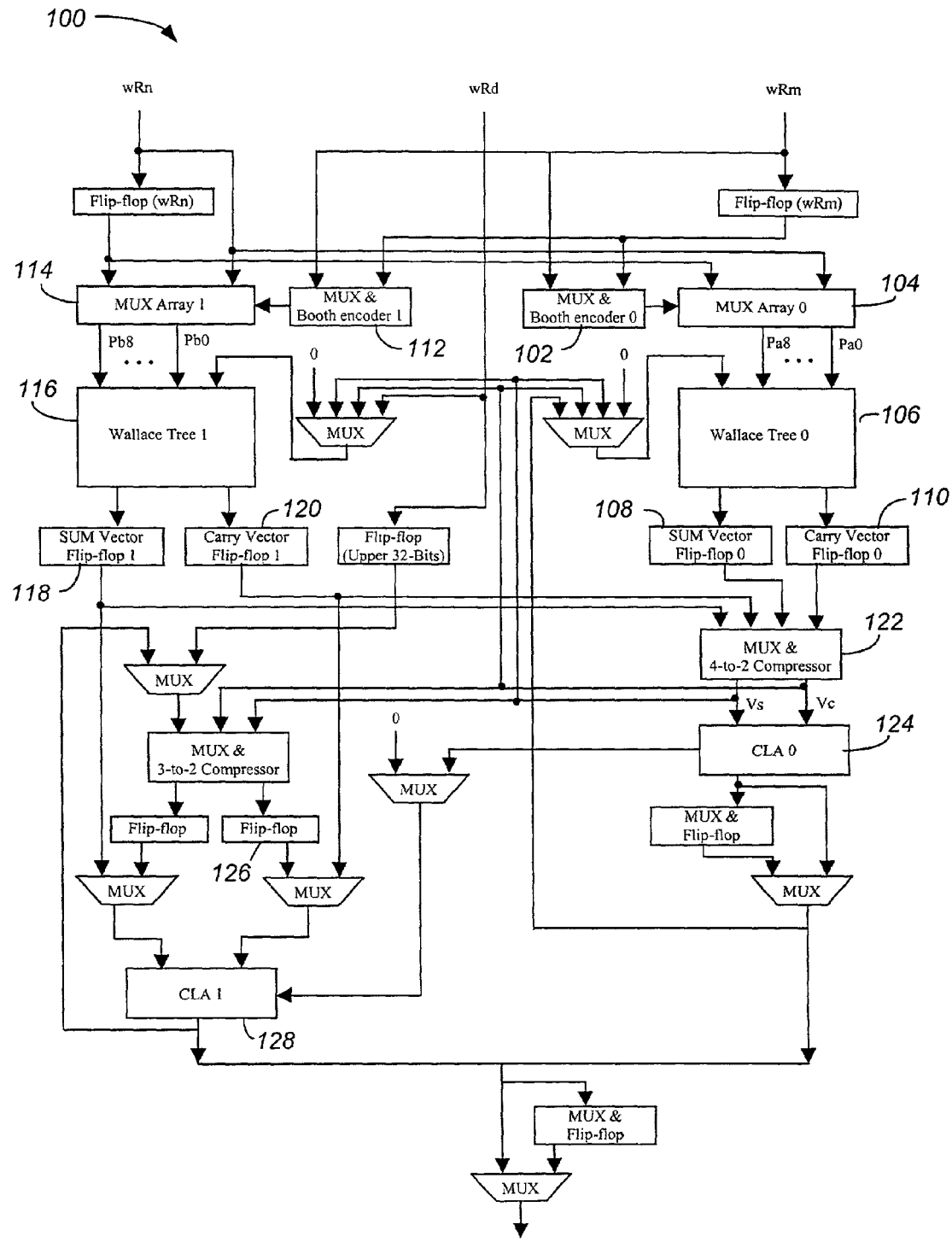
FIG. 1 is block diagram of a dual multiply-accumulate (MAC) unit according to an embodiment.

FIG. 1 illustrates a Multiply-Accumulate (MAC) unit 100 according to an embodiment. The MAC unit 100 may be used to perform a number of different SIMD (Single-Instruction/Multiple-Data) operations.

Figure 2:
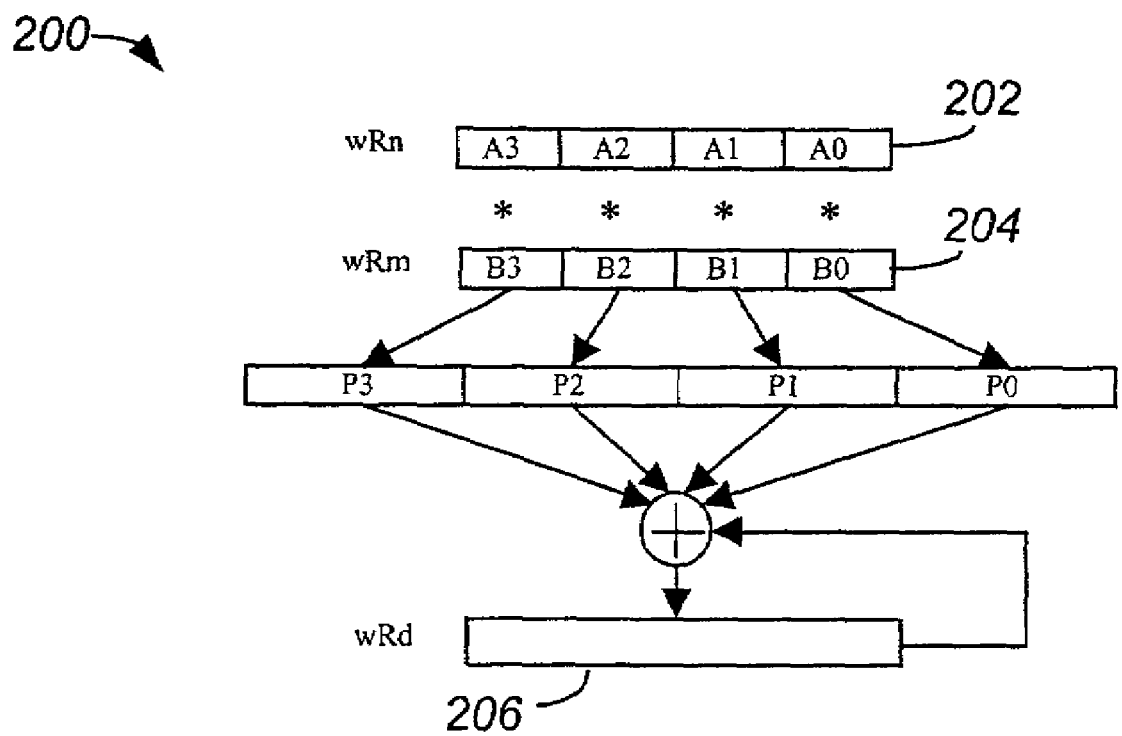
FIG. 2 is a block diagram illustrating a MAC SIMD (Single-Instruction/Multiple-Data) operation according to an embodiment.

The MAC unit 100 may have a tightly coupled dual 16-bit MAC architecture. A 16-bit MAC SIMD operation 200 which may be performed by such a MAC unit is shown conceptually in FIG. 2. The contents of two 64-bit registers, 202 (wRn) and 204 (wRm), may be treated as four pairs of 16-bit values, $A_0$–$A_3$ (wRn) and $B_0$–$B_3$ (wRm). The first 16 bits to fourth 16 bits of wRn are multiplied by the first 16 bits to fourth 16 bits of wRm, respectively. The four multiplied results $P_0$–$P_3$ are then added to the value in 64-bit register 206 (wRd), and the result is sent to a register 206.

The MAC operation 200 may be implemented in four execution stages: (1) Booth encoding and Wallace Tree compression of $B_1$ and $B_0$; (2) Booth encoding and Wallace Tree compression of $B_3$ and $B_2$; (3) 4-to-2 compression, and addition of the low 32-bits of the result; and (4) addition of the upper 32-bits of the result. These four stages may be referred to as the CSA0, CSA1, CLA0, and CLA1 stages, respectively.

Figure 3A:
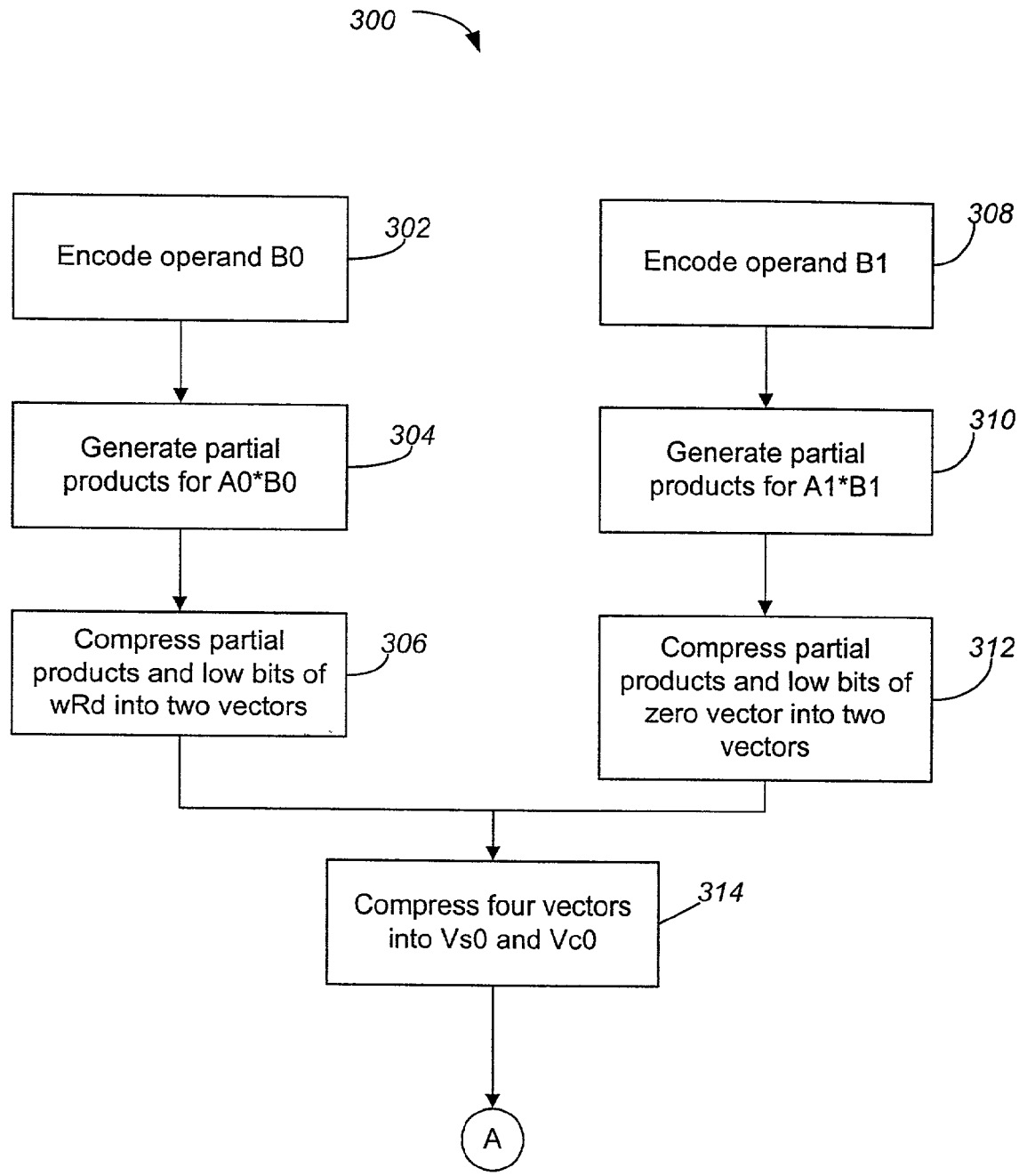
FIGS. 3A to 3C are flowcharts describing a MAC SIMD operation according to an embodiment.
Figure 3B:
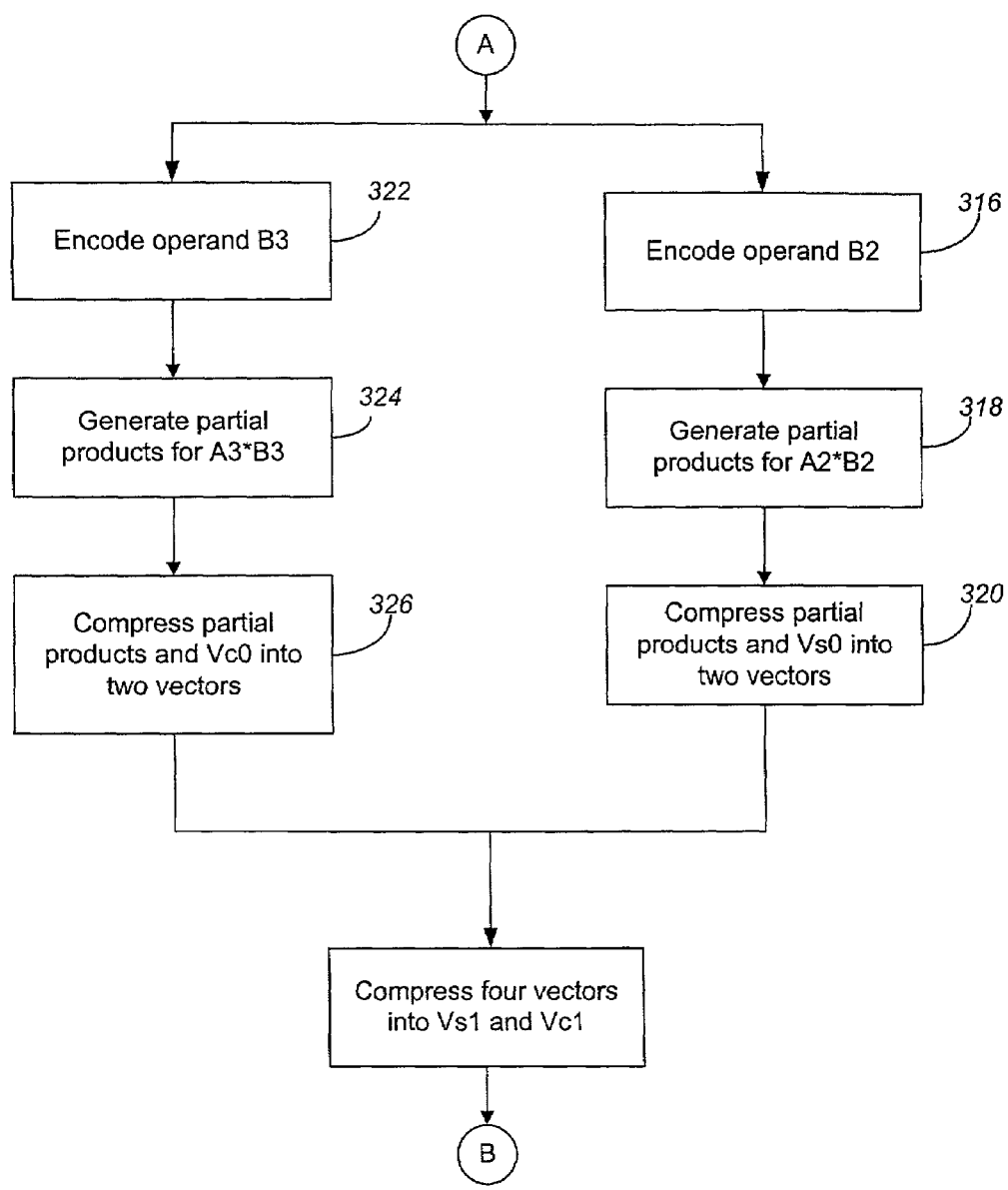
Figure 3C:
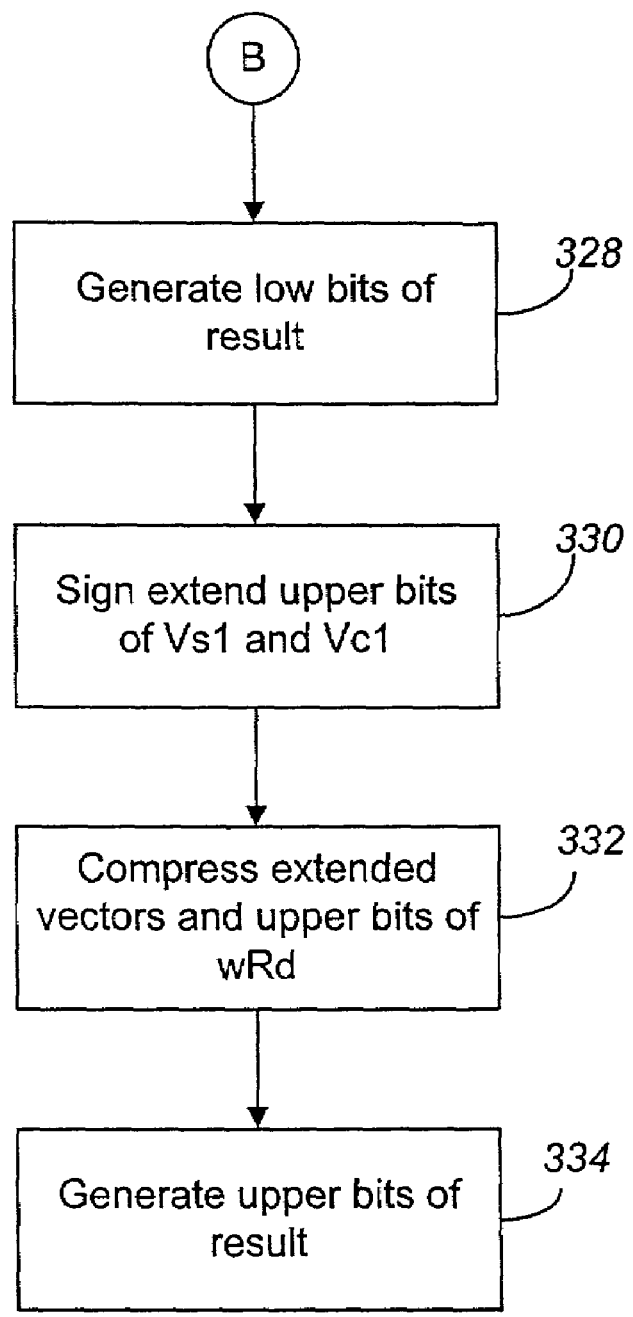

FIGS. 3A to 3C illustrate a flow chart describing an implementation 300 of the MAC operation 200 according to an embodiment. In the CSA0 stage, a MUX & Booth encoder unit 102 selects $B_0$ (16 bits) and encodes those bits (block 302). Control signals are generated, each of which select a partial product vector from the set $\{0, -A_0, -2A_0, A_0, 2A_0\}$. Nine partial product vectors, Pa0 to Pa8, are generated and passed to a MUX array 104 (block 304). All nine partial product vectors and the low 32 bits of the value in register 206 (wRd) are compressed into two vectors by a Wallace Tree unit 106 (block 306). The two vectors include a sum vector and a carry vector, which are stored in a sum vector flip-flop (FF) 108 and a carry vector FF 110, respectively.

A MUX & Booth encoder unit 112 selects $B_1$ (16 bits) and encodes those bits (block 308). Control signals are generated, each of which select a partial product vector from the set $\{0, -A_1, -2A_1, A_1, 2A_1\}$. Nine partial product vectors, Pb0 to Pb8, are generated and passed to a MUX array 114 (block 310). All nine partial product vectors and a zero vector are compressed into two vectors by a Wallace Tree unit 116 (block 312). The two vectors include a sum vector and a carry vector, which are stored in a sum vector FF 118 and a carry vector FF 120, respectively.

In the CSA1 stage, four vectors from the sum and carry vectors FFs 108, 110, 118, and 120 from the CSA0 stage are compressed into vectors $Vs_0$ and $Vc_0$ by a MUX & 4-to-2 compressor unit 122 (block 314). The MUX & Booth encoder unit 102 selects $B_2$ (16 bits) and encodes those bits (block 316). Control signals are generated, each of which select a partial product vector from the set $\{0, -A_2, -2A_2, A_2, 2A_2\}$. Nine partial product vectors are generated (block 318). All nine partial product vectors and vector $Vs_0$ are then compressed into two vectors by the Wallace Tree unit 106 (block 320). The two vectors include a sum vector and a carry vector, which are stored in a sum vector FF 108 and a carry vector FF 110, respectively.

The MUX & Booth encoder 112 selects $B_3$ (16 bits) and then encodes those bits (block 322). Control signals are generated, each of which select a partial product vector from the set $\{0, -A_3, -2A_3, A_3, 2A_3\}$. Nine partial product vectors are generated (block 324). All nine partial product vectors and vector $Vc_0$ are then compressed into two vectors by the Wallace Tree unit 116 (block 326). The two vectors include a sum vector and a carry vector, which are stored in a sum vector FF 118 and a carry vector FF 120, respectively.

In the CLA0 stage, four vectors from FFs 108, 110, 118, and 120 from the CSA1 stage are sent to the 4-to-2 compressor unit 122 to generate vector $Vs_1$ and vector $Vc_1$ (block 327). The lower 32 bits of $Vs_1$ and $Vc_1$ are added by the carry look-ahead (CLA) unit 124 to generate the low 32 bits of the final result (block 328).

In the CLA1 stage, the upper bits of $Vs_1$ and $Vc_1$ are sign extended to two 32-bit vectors (block 330). The extended vectors and the upper 32-bits of wRd are then compressed into two vectors by a 3-to-2 compressor unit 126 (block 332). Two compressed vectors and carry-in bit from the CLA0 unit 124 are added together by CLA unit 128 to generate the upper 32-bits of the final result (block 334).

As described above, the Booth encoding and vectors compressing take two cycles to finish. In the first cycle, the results from both Wallace Tree units are sent back for further processing in the second cycle. Conventionally, all four vectors from FFs 108, 110, 118, and 120 would be sent back to the Wallace trees for further processing in the second cycle. However, it has been observed that the MUX & 4-to-2 compressor unit 122 may perform the 4-to-2 compression of the vectors faster than the MUX & Booth encoder units and the MUX arrays. Thus, only two vectors (Vs$_0$ and Vc$_0$) from the MUX & 4-to-2 compressor unit 122 are sent back to the Wallace Tree units 106 and 116. With this architecture, the feedback routings may be reduced and the Wallace Tree units 106, 116 made relatively smaller. Less feedback routings make the layout easier, which is desirable since routing limitations are an issue in MAC design.

Some conventional MAC implementations perform the 64-bit addition in one cycle. However, such MACs may not be suitable for a very high frequency 64-bit datapath, and their results may not have enough time to return through the bypass logic, which is commonly used for solving data dependency in pipelining. Compared with conventional architectures, the dual MAC architecture shown in FIG. 1 may be more readily implemented in very high frequency and low power application. The CLA1 stage may have less logic gates than that of CLA0 stage, which enables the final results to have enough time to return through the bypass logic, making this dual MAC architecture suitable for a high speed and low power 64-bit datapath.

The MAC unit may be used in a pipelined DSP. Pipelining, which changes the relative timing of instructions by overlapping their execution, may increase the throughput of a DSP compared to a non-pipelined DSP. However, pipelining may introduce data dependencies, or hazards, which may occur whenever the result of a previous instruction is not available and is needed by the current instruction. The current operation may be stalled in the pipeline until the data dependency is solved.

Typically, data forwarding is based on a final result of an operation. For many DSP algorithms, the result of the previous MAC operation needs to be added to the current MAC operation. However, a MAC operation may take four cycles to complete, and the result of the previous MAC operation may not be available for the current MAC operation. In this case, a data dependency called an accumulating dependency is introduced.

Figure 4A:
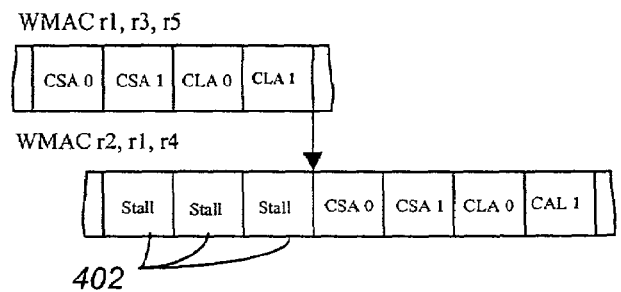
FIGS. 4A to 4C are block diagrams illustrating pipelined instruction sequences utilizing data forwarding according to an embodiment.
Figure 4B:
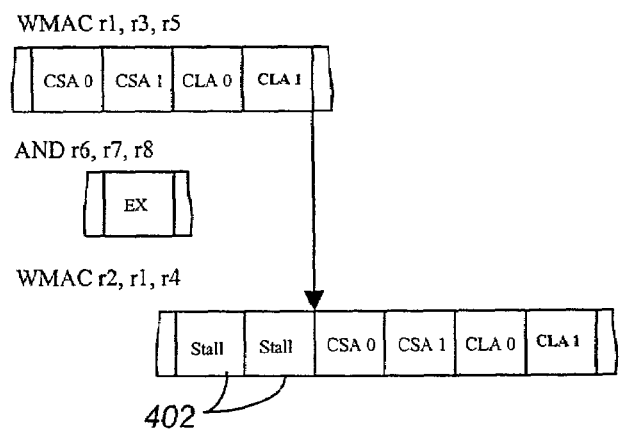
Figure 4C:
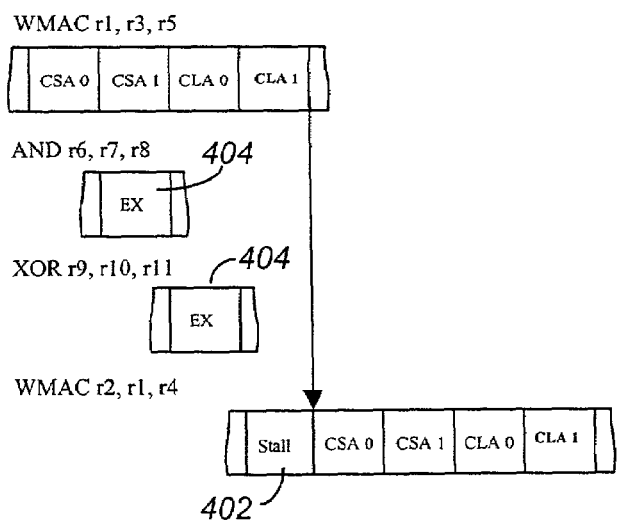

FIGS. 4A–4C show possible accumulating dependency penalties for a standard data forwarding scheme. The standard forwarding scheme is used to reduce the accumulating dependency penalty, where EX 402 is the execution stage for other non-MAC instructions. Even if the standard data forwarding is employed, an accumulating dependency penalty is still two cycles in the worst case, which is shown in FIG. 4A (note that, although there are three stalls 404 before the final result is available after the CLA1 stage, the first stall 404 in FIG. 4A is due to a resource conflict in the Wallace Tree unit, which is not counted as data dependency penalty). Two cycle penalties may be too severe for some DSP applications, and hence it is desirable to eliminate the accumulating dependency penalty.

The MAC unit 100 may be used to implement a new data forwarding scheme, referred to as intermediate data forwarding, which may eliminate the accumulating dependency penalty. Instead of waiting for a final result from a previous operation, the intermediate data forwarding scheme forwards an intermediate result to solve data dependencies.

Figure 5A:
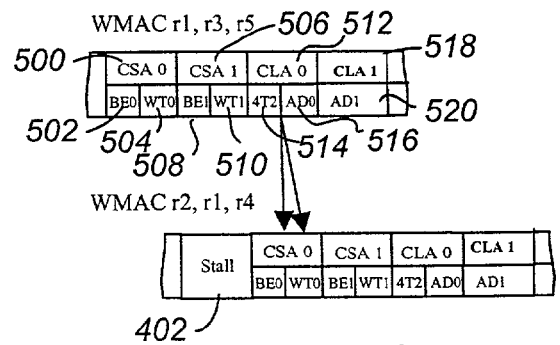
FIGS. 5A to 5C are block diagrams illustrating pipelined instruction sequences utilizing intermediate data forwarding according to an embodiment.
Figure 5B:
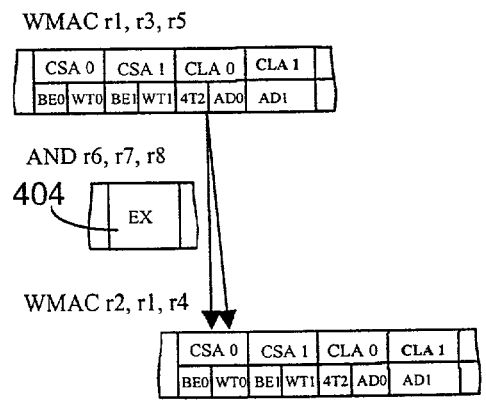
Figure 5C:
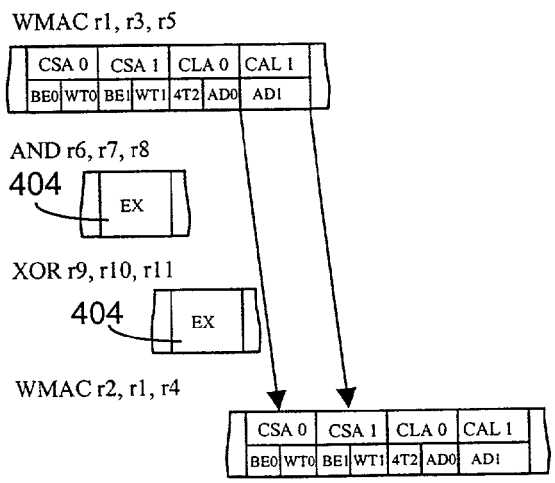

FIGS. 5A–5C illustrate the sequences shown in FIGS. 4A–4C, but implemented using an intermediate data forwarding technique.

As shown in FIGS. 5A–5C, the CSA0 stage 500 is segmented into two sub-stages 502 (BE0) and 504 (WT0) for Booth encoding and Wallace tree compressing, respectively, operands B$_0$ and B$_1$. The CSA1 stage 506 is segmented into two sub-stages 508 (BE1) and 510 (WT1) for Booth encoding and Wallace tree compressing, respectively, operands B$_2$ and B$_3$. The CLA0 stage 512 is segmented into two sub-stages 514 (4T2) and 516 (ADD0) for 4-to-2 compressing of vectors and low 32-bit addition of the final result. The CLA1 stage 518 includes the upper 32-bit addition of the final result 520 (ADD1).

In the cases shown in FIGS. 5A and 5B, the low 32-bits of intermediate vectors Vs, Vc of the first MAC instruction may be forwarded to the Wallace Tree units 106 and 116 for the second MAC instruction to solve the accumulating dependency. The upper 32-bit result of the first MAC instruction from the CLA1 unit 128 is forwarded to the MUX & 3-to-2 compressor unit 126. The stall 404 in FIG. 5A is due to the Wallace Tree resource conflict, which is not counted as data dependency penalty.

In the case shown in FIG. 5C, the final result of the first MAC instruction is not available when it is needed by the second MAC instruction, but the low 32-bit result of the first MAC instruction is available. Instead of waiting for the final result, the low 32-bit result of the first MAC instruction is forwarded to the Wallace Tree unit 106 to solve the accumulating dependency. The upper 32-bit result of the first MAC instruction from the CLA1 unit 126 is forwarded to the MUC & 3-to-2 compressor unit 128.

The accumulating data dependency penalty comparisons between the standard data forwarding technique shown in FIGS. 4A to 4C and the intermediate data forwarding technique shown in FIGS. 5A to 5C are given in Table 1. As shown in Table 1, intermediate data forwarding may eliminate accumulating dependencies, which may enable relatively high throughput for many DSP applications.

TABLE 1

|  | Penalty for case (A) | Penalty for case (B) | Penalty for case (C) |
|---|---|---|---|
| Standard data forwarding | 2 cycles | 2 cycles | 1 cycle |
| Intermediate data forwarding | 0 cycles | 0 cycles | 0 cycles |

A tightly coupled dual 16-bit MAC unit, such as that shown in FIG. 1, may be used for 32-bit×32-bit instructions as well as 16-bit SIMD instructions according to an embodiment. A 32-bit×32-bit operation may be divided into four 16-bit×16-bit operations, as shown in the following equation:

$$A[31:0] \times B[31:0] = (A[31:16] \times B[15:0] \times 2^{16} + A[15:0] \times B[15:0]) + (A[31:16] \times B[31:16] \times 2^{16} + A[15:0] \times B[31:16]) \times 2^{16}.$$

Figure 6A:
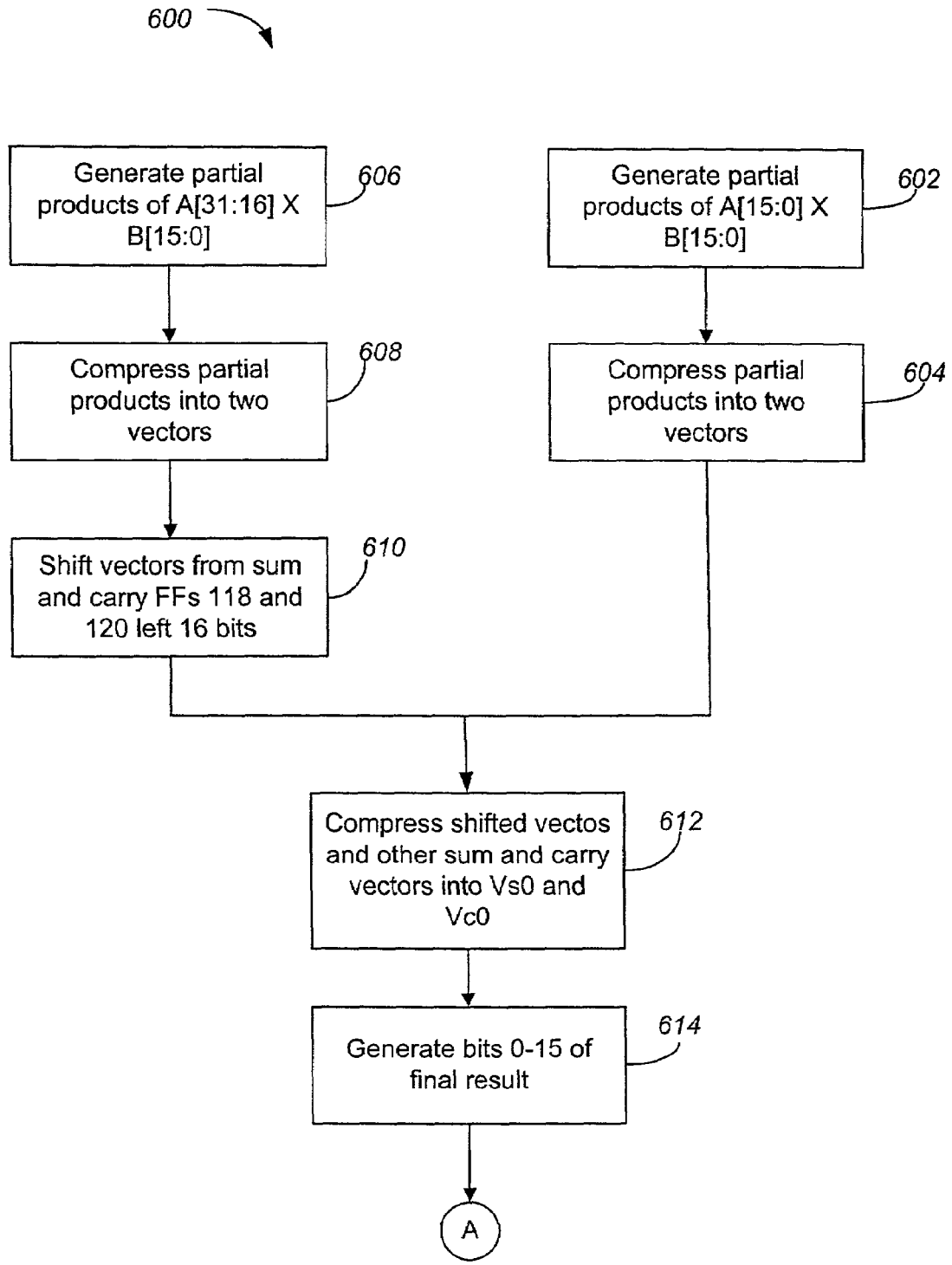
FIGS. 6A and 6B are flowcharts describing a 32-bit × 32-bit MAC operation performed on a tightly coupled dual 16-bit MAC unit according to an embodiment.
Figure 6B:
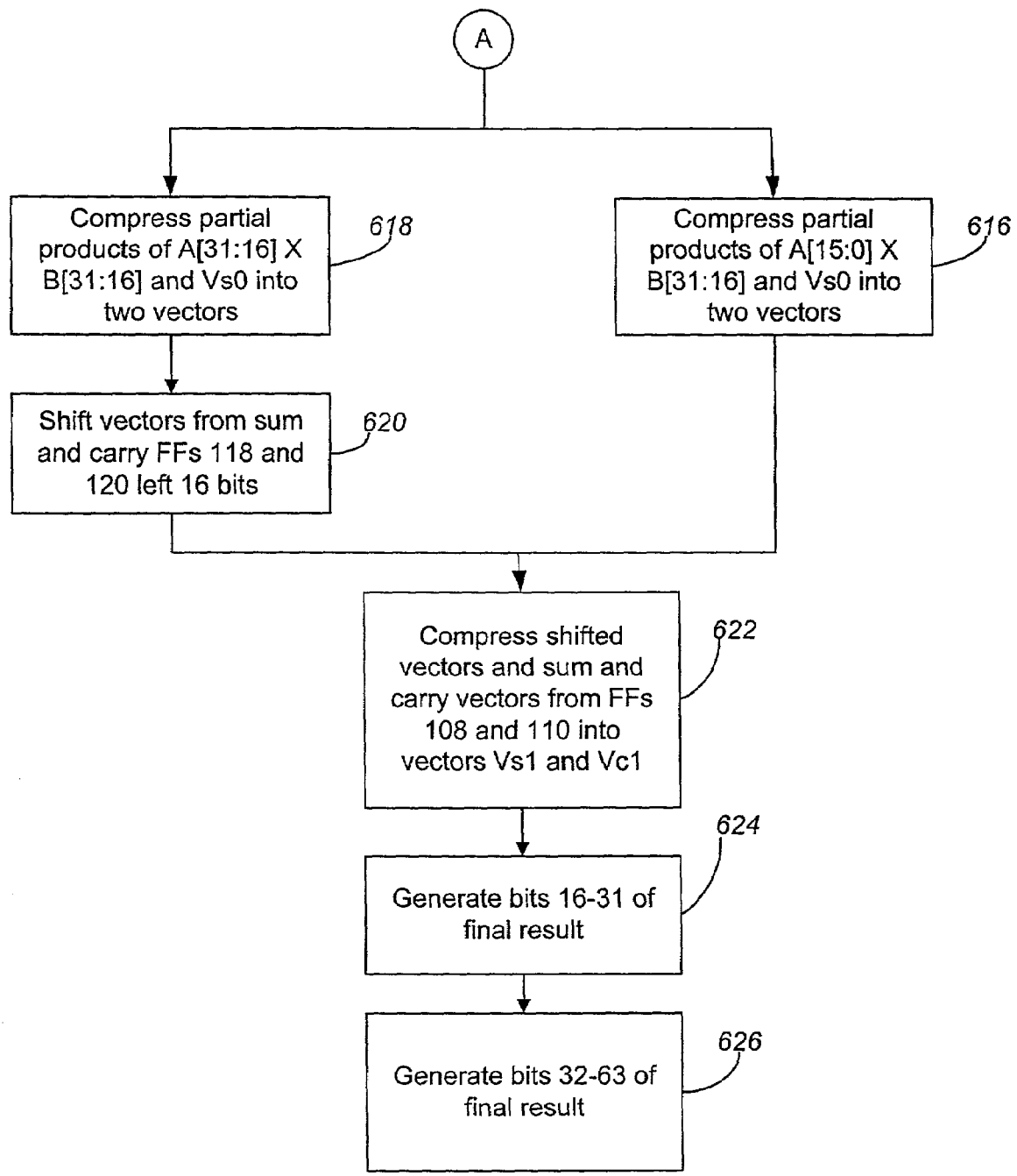

FIG. 6 is a flow chart describing a 32-bit×32-bit MAC operation 600 according to an embodiment. In the CSA0 stage, the partial product vectors of A[15:0]×B[15:0] are generated by the MUX & Booth encoder unit 102 (block 602). The Wallace Tree unit 106 compresses the partial product vectors into two vectors (block 604). The two vectors include a sum vector and a carry vector, which are stored in the sum vector FF 108 and the carry vector FF 110, respectively. The partial product vectors of A[31:16]×B[15:0] are generated by the MUX & Booth encoder unit 112 (block 606). The Wallace Tree unit 116 compresses the partial product vectors into two vectors (block 608). The two vectors include a sum vector and a carry vector, which are stored in the sum vector FF 108 and the carry vector FF 110, respectively.

In the CSA1 stage, two vectors from the sum vector FF 118 and carry vector FF 120 are shifted left 16 bits (block 610). The MUX & 4-to-2 compressor unit 122 compresses the shifted vectors and the other two vectors from the sum vector FF 108 and carry vector FF 110 into vector $Vs_0$ and vector $Vc_0$ (block 612). The low 16 bit of $Vs_0$ and $Vc_0$ are sent to the CLA0 unit 124. The remaining bits are sent back to the Wallace Tree units 106 and 116. The final results from bit 0 to bit 15 are then generated by the CLA0 unit 124 (block 614). The partial product vectors of A[15:0]×B[31:16] and the feedback vector from $Vs_0$ are then compressed into two vectors by the Wallace Tree unit 106 (block 616). The two vectors include a sum vector and a carry vector, which are stored in the sum vector FF 108 and the carry vector FF 120, respectively. The partial product vector of A[31:16]×B[31:16] and the feedback vector from $Vs_0$ are then compressed into two vectors by the Wallace Tree unit 116 (block 618). The two vectors include a sum vector and a carry vector, which are stored in the sum vector FF 118 and the carry vector FF 120, respectively.

In the CLA0 stage, two vectors from the sum vector FF 118 and the carry vector FF 120 are shifted left 16 bits (block 620). The MUX & 4-to-2 compressor unit 122 compresses the shifted vectors and the other two vectors from the sum vector FF 108 and the carry vector FF 110 into vector $Vs_1$ and vector $Vc_1$ (block 622). The low 16 bits of vectors $Vs_1$ and $Vc_1$ are added by the CLA0 unit 124. The final results from bit 16 to bit 31 are then generated (block 624).

In the CLA1 stage, the upper bits (from bit 16 to bit 47) of vectors $Vs_1$ and $Vc_1$ are added by the CLA1 unit 128 to generate the upper 32-bit final results (from bit 32 to bit 63) (block 626).

The MAC unit 100 may be implemented in a variety of systems including general purpose computing systems, digital processing systems, laptop computers, personal digital assistants (PDAS) and cellular phones. In such a system, the MAC unit may be included in a processor coupled to a memory device, such as a Flash memory device or a static random access memory (SRAM), which stores an operating system or other software applications.

Such a processor may be used in video camcorders, teleconferencing, PC video cards, and High-Definition Television (HDTV). In addition, the processor may be used in connection with other technologies utilizing digital signal processing such as voice processing used in mobile telephony, speech recognition, and other applications.

Figure 7:
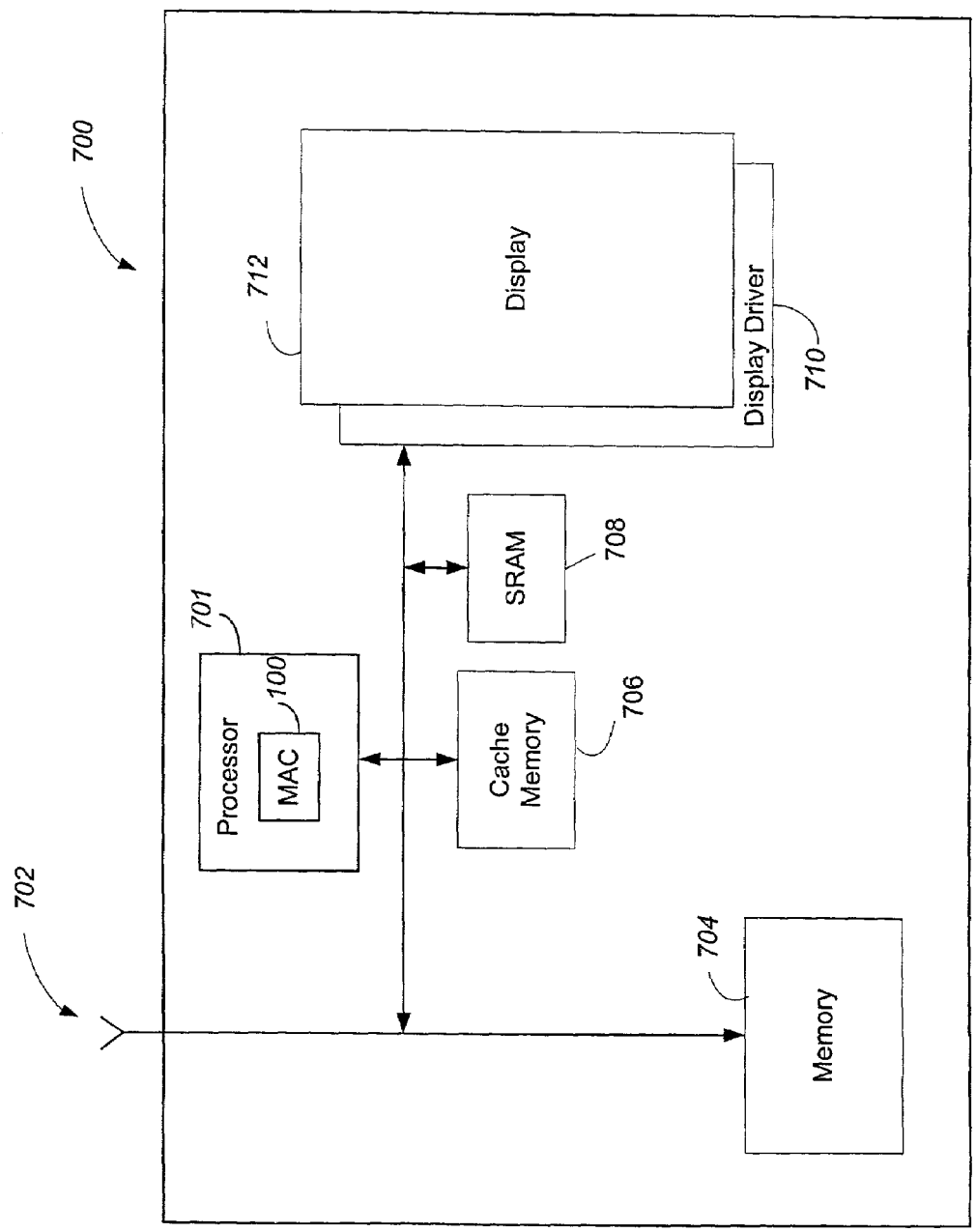
FIG. 7 is a block diagram of a mobile video unit including a MAC unit according to an embodiment.

For example, FIG. 7 illustrates a mobile video device 700 including a processor 701 including a MAC unit 100 according to an embodiment. The mobile video device 700 may be a hand-held device which displays video images produced from an encoded video signal received from an antenna 702 or a digital video storage medium 704, e.g., a digital video disc (DVD) or a memory card. The processor 100 may communicate with a cache memory 706, which may store instructions and data for the processor operations, and other devices, for example, an SRAM 708.

A number of embodiments have been described. Nevertheless, it will be understood that various modifications may be made without departing from the spirit and scope of the invention. For example, blocks in the flowchart may be skipped or performed out of order and still produce desirable results. Furthermore, the size of the operands and number of operands operated on per SIMD instruction may vary. Accordingly, other embodiments are within the scope of the following claims.

The ivention claimed is:

1. An article comprising a machine-readable medium which stores machine-executable instructions, the instructions causing a machine to:
   perform a first compression operation in a first multiply-accumulate operation in a pipeline;
   generate two or more intermediate vectors in a first compression operation in the first multiply-accumulate operation; and
   forward at least a portion of each of the two or more intermediate vectors to a second multiply-accumulate operation in the pipeline prior to completion of the first multiply-accumulate operation.

2. The article of claim 1, wherein the instructions causing the machine to forward at least a portion of each of the two or more intermediate vectors include instructions causing the machine to forward a lower number of bits of each of the two or more intermediate vectors.

3. The article of claim 1, wherein the instructions causing the machine to perform the first compression operation include instructions causing the machine to compress a first plurality of partial products into a first sum vector and a first carry vector and compress a second plurality of partial products into a second sum vector and a second carry vector.

4. The article of claim 1, wherein the instructions causing the machine to generate two or more intermediate vectors include instructions causing the machine to compress the first and second sum vectors and the first and second carry vectors into an intermediate sum vector and an intermediate carry vector.

5. The article of claim 1, wherein the instructions causing the machine to forward include instructions causing the machine to forward at least a portion of each of the two or more intermediate vectors to a Wallace tree compression unit.

6. An article comprising a machine-readable medium which stores machine-executable instructions, the instructions causing a machine to:
   compress a first plurality of partial products into a first sum vector and a first carry vector and compressing a second plurality of partial products into a second sum vector and a second carry vector in a first Wallace tree compression stage of a first multiply-accumulate operation;
   compress the first and second sum vectors and the first and second carry vectors into a first intermediate sum vector and a first intermediate carry vector;
   compress the intermediate sum vector and a third plurality of partial products and compressing the intermediate carry vector and a fourth plurality of partial products in a second stage of the first multiply-accumulate operation; and
   forward the intermediate sum and carry vectors to a second multiply-accumulate operation in a pipeline prior to completion of the first multiply-accumulate operation.

7. The article of claim 6, wherein the first multiply-accumulate operation comprises a single instruction/multiple data (SIMD) operation.

8. The article of claim 6, further comprising instructions causing the machine to:
   generate the first plurality of partial products from a first pair of operands;

generate the second plurality of partial products from a second pair of operands;
generate the third plurality of partial products from a third pair of operands; and
generate the fourth plurality of partial products from a fourth pair of operands.

9. The article of claim 6, wherein the instructions causing the machine to forward include instructions causing the machine to eliminate an accumulate data dependency in the second multiply-accumulate operation.

* * * * *